(12) United States Patent
Dibene et al.

(10) Patent No.: US 7,554,384 B2
(45) Date of Patent: Jun. 30, 2009

(54) METHODS AND ARRANGEMENTS FOR GENERATING A CONTROL SIGNAL FOR A POWER CONVERTER

(75) Inventors: Ted Dibene, Olympia, WA (US); Tomm Aldridge, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 272 days.

(21) Appl. No.: 11/478,994

(22) Filed: Jun. 30, 2006

(65) Prior Publication Data

US 2008/0002312 A1   Jan. 3, 2008

(51) Int. Cl.
*G05F 1/10* (2006.01)

(52) U.S. Cl. .................. 327/535; 361/81; 327/108; 327/530

(58) Field of Classification Search ............. 327/108, 327/109, 333

See application file for complete search history.

(56) References Cited

U.S. PATENT DOCUMENTS 6,262,564 B1 * 7/2001 Kanamori .............. 323/224
6,686,899 B2 * 2/2004 Miyazawa et al. ......... 345/100
2006/0040449 A1 * 2/2006 Lotfi et al. ................ 438/303

* cited by examiner

*Primary Examiner*—Lincoln Donovan
*Assistant Examiner*—Ryan C Jager
(74) *Attorney, Agent, or Firm*—Schubert Osterrieder & Nickelson PLLC; Jeffrey S. Schubert

(57) ABSTRACT

A "digital data stream," "binary sequence" or word can be generated by a logic circuit such as a processor and the sequence can be converted to a series of pulses such that the content of the sequence can be utilized to accurately control/drive a plurality of power transistors. Accordingly, a regulated voltage can be provided through such a data type output of a processor. Thus, a standard processor that executes data processing operations can provide a low level logic signal as a serial digital transmission, possibly a four bit word, and control a power supply without significant modification. To achieve such a conversion the processor can be capacitively coupled to a voltage level shifter and a delay module to provide a plurality of power transistor drive signals. The converter can be wholly integrated onto a processor or motherboard to eliminate devices and stand alone assemblies that are commonly required in data processing systems.

6 Claims, 4 Drawing Sheets

METHODS AND ARRANGEMENTS FOR GENERATING A CONTROL SIGNAL FOR A POWER CONVERTER

FIELD

The present disclosure relates generally to electronic circuits. More particularly, embodiments of the present disclosure are related to the field of generating control signals for a power converter.

BACKGROUND

Power supplies are typically discrete assemblies that are mounted to a device chassis, or are mounted separately from assemblies that facilitate data processing. However, to conserve space and provide other benefits, many designers are attempting to integrate power supplies or voltage regulators onto motherboards proximate to processors, memory and various other data processing circuits. Such integration presents many design challenges. For example, precision control signals are required to operate switching power supplies and generating such signals on a motherboard in not a trivial design task. Further, for such integration to be feasible, a low cost approach for generating power conversion control signals on a motherboard becomes a concern. One way to achieve a low cost solution is to utilize existing hardware such as a processor to create or generate the control signals. However, processor based control signals on a motherboard typically utilize relatively low voltages. For example, processors are often powered by five volts and the digital logic on the output of a processor is often near one volt. Power conversion control systems typically require control signals for power transistors that are in the five volt range, thus a processor output cannot be utilized to control a power supply without some signal conversions. Further, processors typically cannot supply enough current to control or switch the power transistors of the power supply or power converter.

Allowing a processor, existing "onboard" logic, or a data processing circuit to control power transistors can eliminate the need for a large bulky and expensive external power supplies. Another positive feature of onboard power supplies is that, since the supply voltage is regulated near the load, voltage drops and interference caused by relatively long transmission lines can be minimized. Further, redundancy can be achieved due smaller and more numerous power supplies or voltage regulators (VR)s that are supplied with control signals locally, by a processor.

A power converter or VR will typically have power transistors that switch "on and off" to pass a portion of the power or voltage at the input of the VR to the output of the VR. The amount of voltage drop provided by the VR depends on the average "on" time of the power transistors in the VR. Many modern power converters topologies utilize a multi-phase configuration that requires multiple drive signals and there is often a lack of available pins on a typical processor to provide such multiple outputs. Thus minimizing the amount of pins required to control multiple power transistors is another design consideration.

DETAILED DESCRIPTION OF EMBODIMENTS

Figure 1:
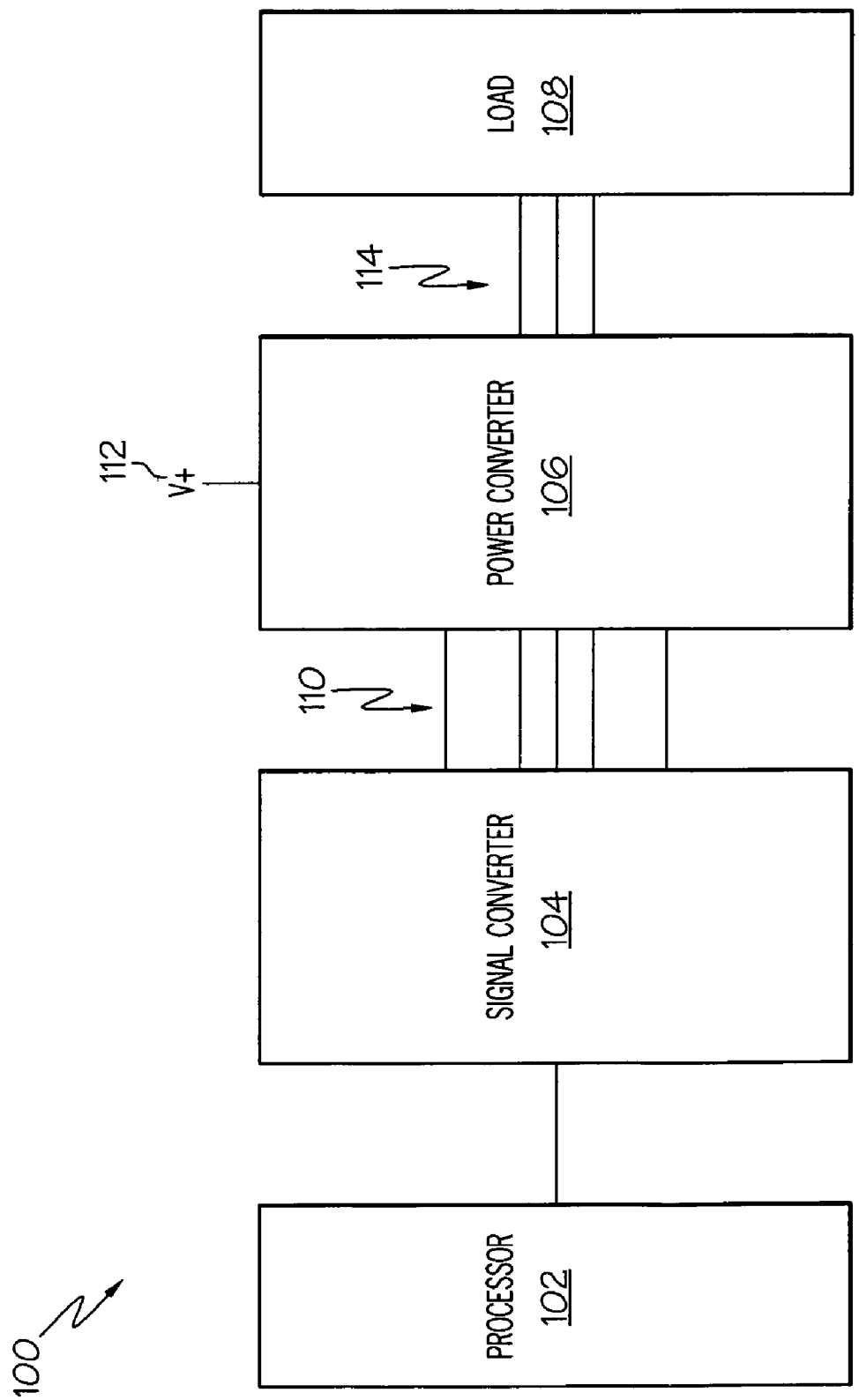
FIG. 1 depicts an embodiment of a control signal generator for an onboard power conversion system.

The following is a detailed description of embodiments of the disclosure depicted in the accompanying drawings. The embodiments are introduced in such detail as to clearly communicate the disclosure. However, the embodiment(s) presented herein are merely illustrative, and are not intended to limit the anticipated variations of such embodiments; on the contrary, the disclosure is to cover all modifications, equivalents, and alternatives falling within the spirit and scope of the appended claims. The detailed descriptions below are designed to make such embodiments obvious to those of ordinary skill in the art.

In accordance with the present disclosure a "digital data stream" or "binary sequence" can be generated by a logic circuit such as a processor and the stream can be converted such that its contents can be utilized to accurately control/drive a plurality of power transistors that provide regulated voltages at their output. Thus, a standard processor that executes data processing operations can provide a low level logic signal as a serial transmission, possibly a four bit word, and the value of the word can dictate the duty cycle and timing of the switching power transistors. Thus, the number of logic high bits in the word can control the "on time" of the power transistors or the duty cycle of the power transistors. The occurrence of a logic low bit in the word can turn the power transistors off. In one example, if the voltage on the output of the power converter sags below a desired value the processor can serially transmit a digital word with additional logic high values and likewise if a the voltage of the converted power is too high the processor can serially transmit a digital word with a reduced amount of logic high bits.

In one embodiment, to achieve such a conversion from a binary sequence to a signal that is compatible with a power transistor drive signal, the processor can be capacitively coupled to the converter where the converter can level shift the voltage level of the bits in the binary sequence. The converter can also provide a plurality of replica signals delayed in time and phase to the power transistors. Thus, the converter can drive a power stage having power transistors that switch and convert power having from a relatively high voltage to a lower voltage. The converter can be wholly integrated onto a processor or motherboard to eliminate the separate assembly that is commonly required by electronic devices. The power transistors can also be integrated into the microprocessor for small power conversion requirements. The control signal generation system disclosed provides a small, robust and inexpensive way to generate onboard power conversion control signals or can provide a built in, or onboard power control system.

In yet another embodiment a method to provide a control signal is disclosed. A digital data signal from a processor can be capacitively coupled to a level shifter (a converter) to level shift the digital data signal. The level shifter signal can be delayed then utilized to drive at least one power transistor such that regulated power can be supplied to a load. In one configuration an impedance matched path can be placed between the processor and the capacitive coupler such that maximum power is transferred between the processor and the level shifter.

In another embodiment a system is disclosed that has a processor having an output to provide a digital signal that transitions between a first voltage and a second voltage, the second voltage having a level that is higher than the first voltage. A level shifter is provided to receive the digital signal and to provide a third voltage in response to receiving the second voltage, and a capacitor is provided to AC couple the digital signal from the processor to the level shifter. The system can further include a delay module coupled to the level shifter to delay the level shifted digital signal, a pre-driver module to prepare the level shifted digital signal to drive at least one power transistor and power transistors to receive the level shifted digital signal and to convert power on a power bus from a first voltage to a second voltage.

In yet another embodiment an electronic system is provided that has a processor having a plurality of inputs to receive data and a plurality of outputs to transmit a series of pulses to data processing circuits and a core to process data. The series of pulses can have a first logic voltage level. A conversion circuit can be coupled to one of the plurality of outputs to accept the series of pulses, the conversion circuits to convert the first logic voltage level of the series of pulses to a power transistor drive level. A plurality of power transistors can be coupled to the conversion circuit to switch power responsive to the series or pulses and at least one load can be coupled to the plurality of power transistors. A feedback system can be coupled to the processor and to at least one of the plurality of power transistors and control the series of pulses such that the proper voltage is maintained at the output.

Referring to FIG. 1, a power conversion system 100 is illustrated. The system 100 can include a logic or data processing circuit such as processor 102, a signal converter 104, a power converter 106, and a load 108. In operation, the processor 102 can generate a serial digital data signal or a binary sequence that transitions from high to low and the signal converter 104 can convert the contents of the signal to provide a corresponding control signal to the power converter 106. The signal converter 104 can utilize each bit on the binary sequence to provide a plurality of different control signals via control lines 110 to the power converter 106. If the regulated voltage at the output of the power converter 106 (or to the load 108) lags below the desired voltage, the processor 102 can provide a binary sequence with more logic high bits to increase the duty cycle of power transistors in the power converter 106.

The power converter 106 can receive power having a relatively high voltage from a power input 112 and utilize power transistors (not shown) to convert the high voltage to a lower voltage. The lower voltage can be a regulated voltage on the output of the power transistors to supply power to load 108. In one embodiment, all of the components illustrated (i.e. 102, 104, 106 and 108) can be part of a processor of part of a single circuit board to provide an "on-board" voltage regulator such that a bulky expensive external power supply can be eliminated as a system requirement.

Figure 2:
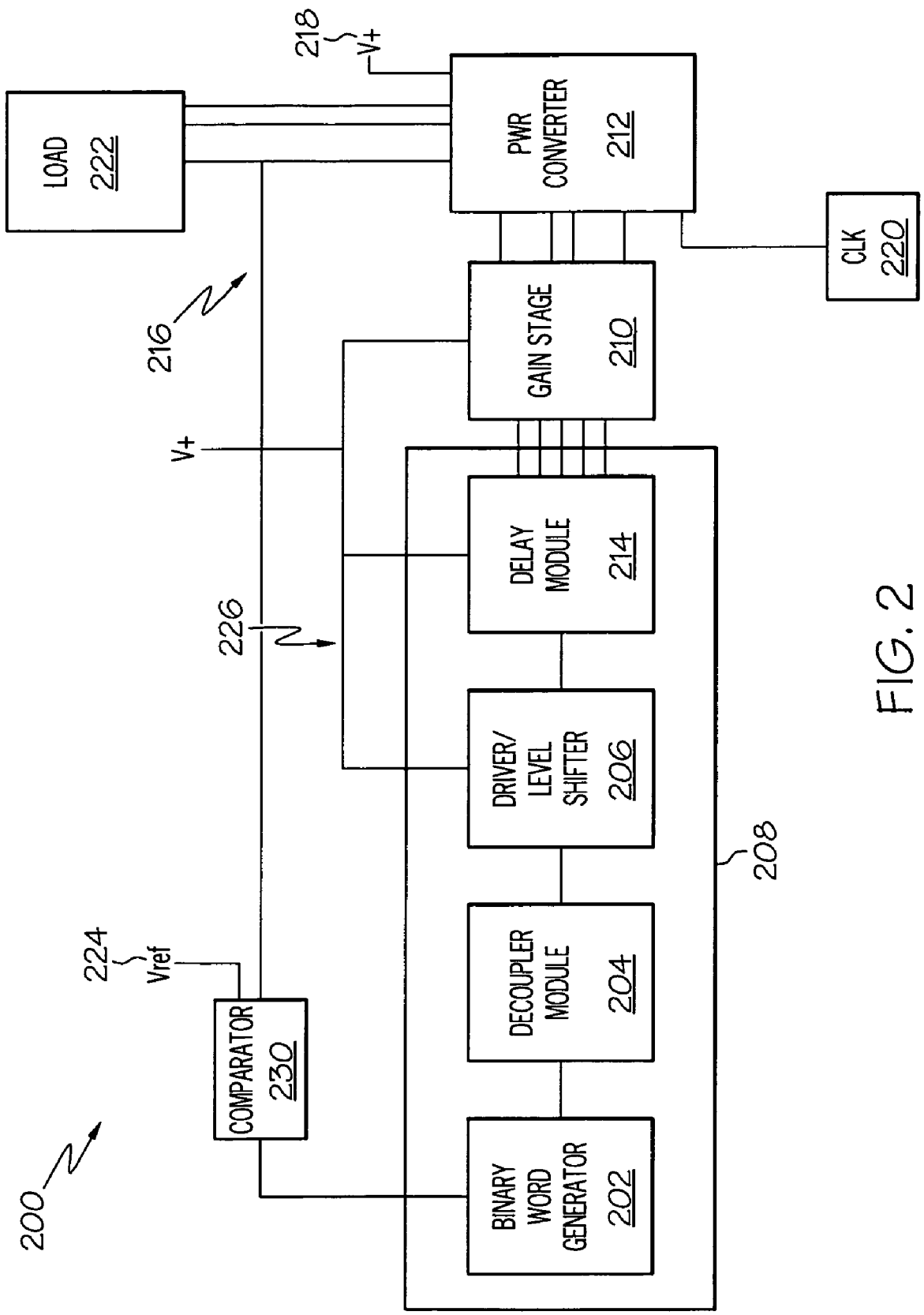
FIG. 2 illustrates another embodiment of a control signal generator for an onboard power conversion system.

Referring to FIG. 2, an embodiment of an onboard power conversion controller system 200 is disclosed. The system 200 can include a binary word generator 202, a de-coupler module 204, a driver/level shifter 206, delay module 214, a gain stage 210, a power converter 212 and a load 222. Components 202, 204 206 and 214 can be integrated with a processor as illustrated by block 208 that contains these elements, and the processor can performs many other functions such as data processing wherein the power components are an ancillary portion of the processor. Power can be provided to driver/level shifter 206 delay module 214 and gain stage 210 via regulated power bus 226.

In operation, the binary word generator 202 can generate a series of bits or a "word" as it is often called by those in the art. The word can specify a duty cycle for the power transistors of the power converter 212. Since the signal level of the word will typically be a relatively low voltage, (possibly lower than one volt) the signal level may need to be increased and modified in other ways before it is provided to the power transistors. One way to increase the voltage level of the binary sequence is to capacitively couple the binary word generator 202 to a driver level shifter 206.

A programmable delay module can receive the level shifted signal and through a series of buffers configured in parallel, provide a series of outputs each different in time delay and phase to the gain stage 210. The programmable delay module can detect a frequency change in the duty cycle and period of the PWM signal and adjust the delay accordingly. The delay 'train' can be setup in a generic fashion to allow a plethora of delay's where each phase may be offset according to the number of phases 'N' and the frequency or period of the signal coming in. For example, if the period is 'x' microseconds long and two delay gates on a phase corresponds to the delay difference between each phase, then if the period becomes two times (2×) long then four delay gates would be required for a delay difference between each phase.

The delays can then be utilized to drive field effect transistors (FET's) or drivers that power the FET's so that the phase alignment for the signals between each converter phase is correct. The frequency or period detector could detect this and then tap off of a gate to provide the appropriate delay. The tapping could be done either automatically or thru an external programmable pin or interconnect feature. The gain stage 210 can utilize the desired signals to drive the power converter 212.

The binary word generator 202 can provide a signal with robust/sharp rise and fall times to the decoupling module 204. Decoupling module 204 can have a series capacitor to block any direct current (DC) components and the decoupling module 204 can provide a sawtooth waveform on its output responsive to voltage transitions provided at its input by the binary word generator 202. The sawtooth waveform output of the decoupling module 204 can be converted to a binary word that is "amplified" or level shifted from the binary word provided by binary word generator 202.

The output of the driver/level shifter 206 can be received by the delay module 214 and the delay module 214 can provide multiple square wave signals on its output with varying time and phase delays responsive to the existence of individual "bits" of the binary word. The outputs of the delay module 214 can be utilized by the gain stage 210 to provide transistor drive signals to power converter 212. Power converter 212 can be connected to power bus 218 and to a system clock module 220. During normal operation, the power converter 212 can accept power from the power bus 218 and convert the power to provide the desired voltage to load 222.

A comparator, possibly within the processor 208 can compare the voltage on the at the load 222, via feedback line 216, with Vref 224 and based on this feedback, the binary word generator 202 can create an appropriate word to adjust the voltage at the load 222 to the desired level thereby regulating a voltage on the output of the power converter 212. Generally, the number of bits in the word with a logic high can control a start time and an "on and off" duration of the power transistors within power converter 212 to produce the voltage and power required by the load 222. The processor 208 can generate signals having many different features where only some of these features are disclosed herein. For example, the provided to the gain stage 210 can have different magnitudes or voltage levels, different durations, different transition times, different phases, different shapes, different rise and fall times and so on. The signal provided to the power converter 212 can depend on the type of power converter 212 utilized and the power requirements of the load 222.

The power converter 212 can convert the voltage level on the power bus 218 to many different voltages. For example, if the power bus 218 provides five volts, the power converter 212 could convert the five volts to one volt (1V) and three and a third volts (3.3V) at its output. The power converter 212 can have transistors, resistors, capacitors, and inductors and can convert power on power bus 218 from a higher voltage to lower voltage and from a lower voltage to a higher voltage. The load 222 may be an integrated circuit, the processor shown 208 or some other active data processing, data storage or data transmitting device.

In one embodiment, the power converter 212 could be a multiphase power converter. In accordance with the present disclosure multiphase control techniques can involve multiple stages or sets of power transistors within the power converter 212. Instead of just one synchronous set of power transistors running at a certain frequency, a multiphase power converter 212 can have multiple stages of power transistors that switch in a time staggered fashion where the transistor operate with a time offset. With just one power stage, the system 200 could take an entire clock cycle to respond to a transient, but with the multiple phases, or multiple control signals generated by a single word, the power converter 212 can respond quickly in a fraction of a clock cycle to adjust the voltage for the transient load. Generally, where "n" defines the number of power stages in the power converter, 1/n can define the fraction of a clock cycle that the power converter 212 can react to a heavy instantaneous change in the load. Heavy short lived transient loads often occur where a circuit processes or transmits a surge of data for a short period of time. The small efficient power delivery system disclosed can be utilized effectively because these relatively large power demand transients can be accommodated with the disclosed configuration.

The system clock module 220 can provide a high speed clock signal to the power converter such that during a high power demand/transients from the load 222, additional power switching stages can be activated such that the desired voltage can be maintained at the output of the power converter 212. Alternately, when the voltage on the power bus 218 sags to low levels, an increased switching frequency may be required for the power converter 212 to maintain the regulated output voltage that is supplied to the load 222.

Figure 3:
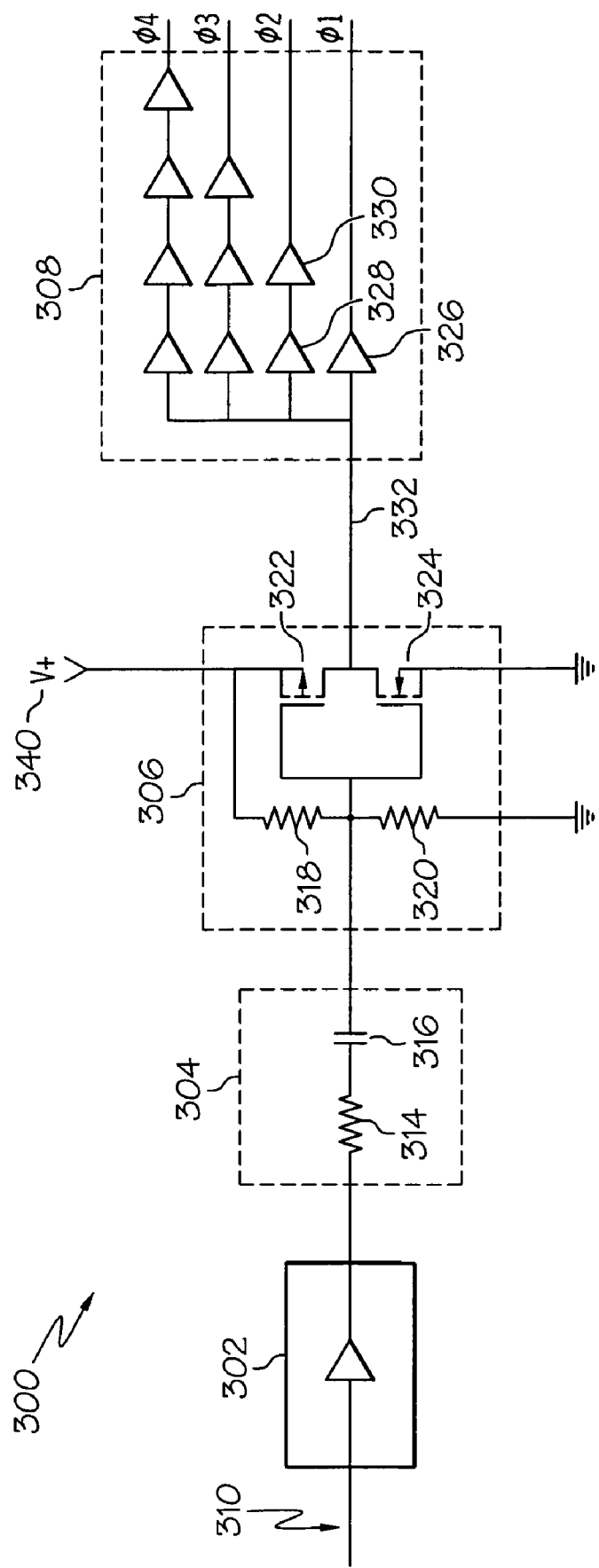
FIG. 3 depicts yet another embodiment of a control signal generator.

Referring to FIG. 3, a specific embodiment of a power conversion control signal generator system 300 is disclosed. The system 300 can include a buffer 302, a de-coupler 304, a drive/level shift module 306 and a delay module 308. An input signal, such as from a register of a microprocessor can be provided on input line 310 to buffer 302. The buffer 302 can be a standard processor driver that can accept a signal that has noise and a slow rise and fall time and provide a robust square pulse or a binary signal with relatively square edges to the decoupler 304. The signal driver or buffer 302 could exist as a spare output on a processor, and thus a minimum amount of pins on a processor would be required to implement such a power conversion system.

The de-coupler 304 can include a resistance indicated by resistor 314, and a capacitor 316 in series with the resistor 314. The resistor 314 can implemented as the equivalent series resistance (ESR) of a trace on a circuit board, thus not requiring the purchase and installation of additional components. In addition, the width, length, thickness and shape of the trace can be altered to provide the desired impedance or resistance value. Additionally, at higher frequencies the trace can be tuned to "impedance match" the output of the buffer at the operating frequency. Tuning can include engineering the trace to a certain length and width such that the trace efficiently transfers maximum signal power from the buffer 302 to the input of capacitor 316. This is often referred to as "tuning" the transmission path to reduce signal power loss.

The capacitor 316 can resist a change in voltage across its terminal and can be sized to provide a desired sawtooth output signal in response to the transitions of the binary sequence provided by the buffer 302. Thus, the square pulse received from the buffer 302 can be converted to a sawtooth pulse by the decoupler 304 wherein each sawtooth pulse can have a desired magnitude and shape based on the resistance value, the size of the capacitor 316 and the tuning of the lumped element circuit of the decoupler 304. Generally, the faster the rise and fall time of the output signal of the buffer 302 and the larger the capacitor 316, the larger the signal of the sawtooth pulse that will be present on the output of the decoupler 304.

The capacitor 316 can block any direct current (DC) components and can provide a sawtooth type transition on its output every time the voltage transitions on the input of the decoupler 304. The output of the decoupler 304 can feed the sawtooth wave to the driver/level shifter 306. The driver/level shifter 306 can utilize the sawtooth pulse provided by the decoupling module 304 to alternately turn on transistors 322 and 324. Transistor 322 turns on when the input signal reaches its threshold voltage, and transistor 322 turns off, and transistor 324 turns on when the input signal goes below/exceeds the threshold voltages of transistor 322 and 324. Resistors 318 and 320 can bias transistors 322 and 324 in a totem pole output configuration often utilized in transistor-transistor-logic (TTL). Thus, as the signal at the output of the decoupled 304 goes, high transistor 324 will turn off and transistor 322 will turn on providing a logic high signal to the input of the delay module 308. When the signal at the output of decoupler 304 goes low, transistor 322 will turn off and transistor 324 will turn on driving the signal on the input of the delay module to near zero volts.

Generally, the driver/level shifter 306 will accept a signal on its input and provide a signal on its output that has a magnitude based on the voltage provided on V+ by power bus 340. Thus a half volt (0.5V) signal on the input of the driver/level shifter 306 can create a signal such as a twelve volt signal on the output of the driver/level shifter circuit if the power bus 340 supplies twelve volts. Driver/level shifter 306 can create a level shifted square pulse at node 332 responsive to the sawtooth pulse present at the input of buffer 310. Although the input signal on input line 310 may have a very low voltage, such as a fraction of a volt, the output of the driver/level shifter 306 can provide a voltage that is much higher than, (or level shifted from) the input signal such that the driver can supply a robust signal to the delay module 308.

The output of the driver/level shifter 306 can be provided to the delay module 308 and the delay module 308 can provide a plurality of different signals on its output each having different time and/or phase delays. The outputs of the delay module 308 could be utilized to control power switching transistors of a power conversion module (not shown). The plurality of signals provided by the delay module 308 can be utilized by a multi phase power converter as mentioned above.

Figure 4:
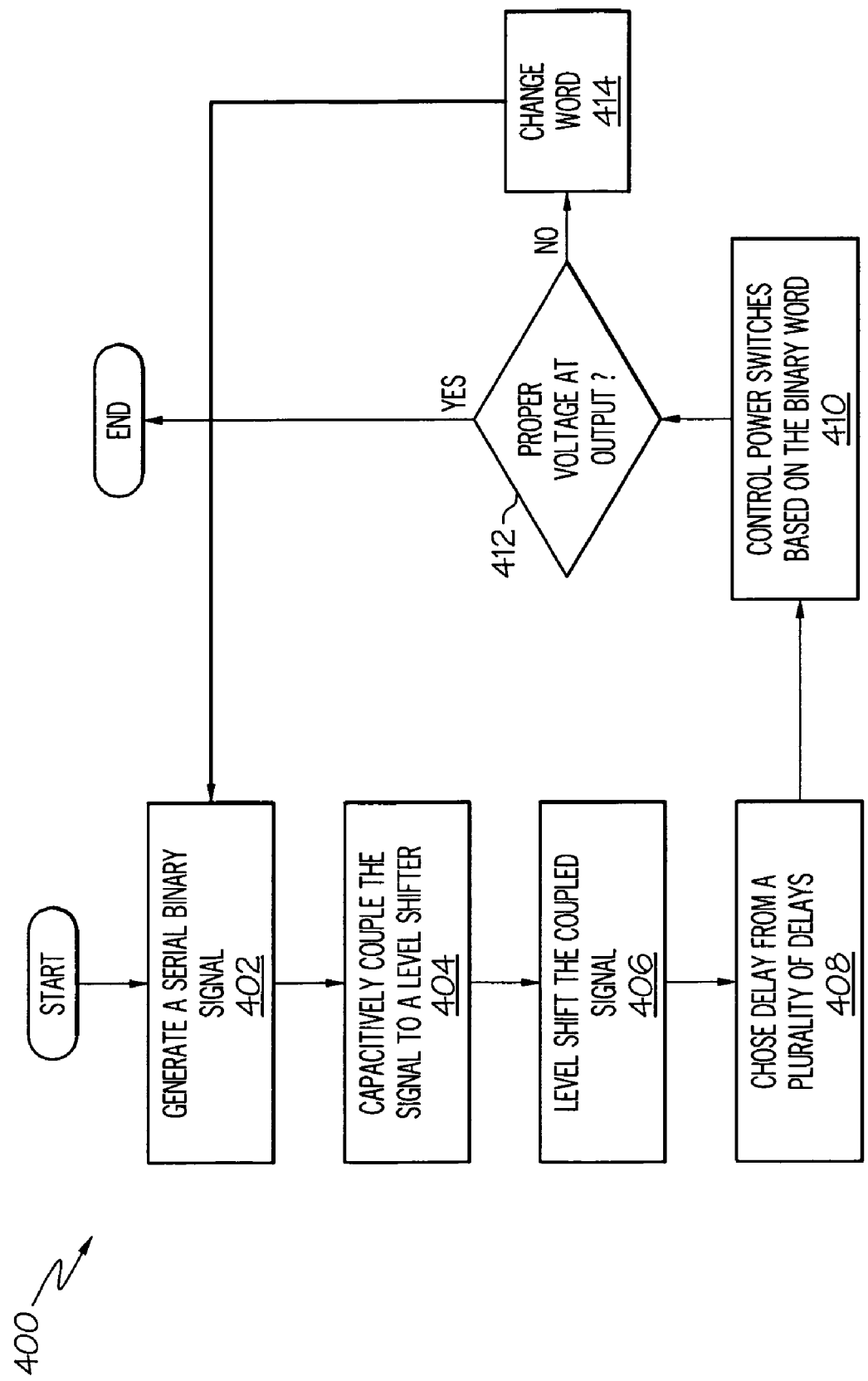
FIG. 4 is a flow diagram illustrating a method for controlling a power conversion module.

Referring to FIG. 4, a flow diagram 400 illustrating a method for controlling a power converter is disclosed. As illustrated by block 402 an input signal such as a serial binary signal that has pulses can be generated based on a sensed voltage at an output. The buffered signal can be capacitively coupled to a level shifter driver circuit as illustrated by block 404. The level shift circuit 406 can shift the voltage of the buffered pulses and possibly change the shape of the pulses to create the desired voltage as illustrated by block 406.

The level shifted signal can be provided to a delay module which can provide multiple outputs having various delays and the desired delay can be selected as illustrated by block 408. The various delays can be utilized by a downstream pre-driver and/or power transistors. The delay module outputs can provide both time delays and phase delays. Delays lines to the pulse width modulator could also be dynamically switched during operation in accordance with the teachings of block 408. The system could utilize a multiplexer as a switching mechanism to route the desired delay to the pulse width modulator.

Power transistors can be controlled by the "altered" or converted binary sequence, as illustrated by block 410. It can be determined at decision block 412 if the appropriate voltage or power is being delivered to the load by the power switches and when the appropriate power level is not present, the binary sequence or word can be changed accordingly, as illustrated by block 414 and the system can continue to control the pulse width as illustrated by block 410. If the proper output voltage is created as illustrated by decision block 412 then the process can end.

The present invention and some of its advantages have been described in detail for some embodiments. It should be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A power supply controller comprising:
   a binary sequence generator to generate, a combination of logic high signals and logic low signals, each of the logic high signals and logic low signals having a substantially fixed time duration and a substantially fixed steady state voltage;
   a level shift module to receive the combination of logic high signals and logic low signals
   a decoupling capacitor connected in a series configuration between the binary sequence generator and the level shift module;
   power transistors coupled to the level shift module to convert power having a first voltage level to power having a second voltage level responsive to the combination of logic high signals and logic low signals; and
   a programmable delay module couple between the level shift circuit and the power transistors to provide a plurality of time staggered signals to the power transistor.

2. The circuit of claim 1, wherein the programmable delay module produces a phase change to at least one time staggered signal of the plurality of time staggered signals.

3. A method to provide a control signal comprising:
   utilizing a digital data driver to generate a signal, the signal having a combination of logic high intervals and logic low intervals that have a substantially fixed steady state voltage and a substantially fixed time duration:
   conveying the generated signal to a level shifter;
   shifting a voltage level of the generated signal;
   controlling a variable delay of the level shifted signal; and
   utilizing the delayed level shifted signal to drive at least one power transistor such that regulated power is supplied to a load.

4. The method of claim 3, further comprising tuning a conductive path between a source of the generated signal and a location where the generated signal is capacitively coupled.

5. The method of claim 3 wherein the generated signal is produced responsive to feedback based on a voltage of the regulated power.

6. An electronic system comprising:
   a processor having a plurality of inputs to receive data, a plurality of outputs to transmit a series of pulses, where each pulse has a substantially fixed duration, to data processing circuits and a core to process data, the series of pulses having a first logic voltage level;
   a conversion circuit coupled to one of the plurality of outputs to accept the series of pulses, the conversion circuits to convert the first logic voltage level of the series of pulses to a power transistor drive voltage level;
   a plurality of power transistors coupled to the conversion circuit to switch power responsive to the series or pulses; and
   at least one load couple to the plurality of power transistors, wherein the load is the processor.

* * * * *